UNITED STATES PATENT OFFICE.

JABEZ BREWSTER, OF TOMBSTONE, ARIZONA TERRITORY.

PROCESS OF PREPARING WHEAT.

1,012,979.  Specification of Letters Patent.  Patented Dec. 26, 1911.

No Drawing.  Application filed January 12, 1911.  Serial No. 602,213.

*To all whom it may concern:*

Be it known that I, JABEZ BREWSTER, a citizen of the United States, and a resident of Tombstone, in the county of Cochise and Territory of Arizona, have invented a new and Improved Process of Preparing Wheat, of which the following is a full, clear, and exact description.

The object of the invention is to provide a new and improved process for preparing wheat as a food product, which is exceedingly nutritious and sweet, easily digested, and capable of remaining in proper condition for an indefinite period of time.

The process consists essentially in soaking the clean wheat in water, then boiling the wheat until a creamy starch forms on the surface, then repeatedly applying hot water for removing the starch and until the water is perfectly clear and transparent, then boiling the wheat and adding salt according to the desired taste to be given to the food product, and then adding boiling water under application of slow heat until the water is absorbed and evaporated when the product is ready for canning.

In detail, I proceed as follows: The wheat is cleaned and scoured from all dirt and extraneous matter by the use of cold water, until the water is clear and transparent. The clean wheat is then placed in a suitable vessel and cold water is added to cover the wheat about three inches, and the wheat is now left to stand for about twelve hours or more, so that the wheat absorbs water, the water being changed say every six hours. The wheat, covered with water for about three inches, is then boiled for two hours or until a creamy starch forms on the surface, at which time the wheat is ready for the removal of the starch which is done by replenishing with hot water and removal of the same. The replenishing and removal of hot water is repeated until the water is perfectly clear and transparent. Boiling water is now added to the wheat so as to cover the same two or three inches, and then the wheat is boiled for an hour or so under the addition of salt to suit the taste. The water is replenished as before and then the mass is subjected to a slow fire until the water is all absorbed and evaporated, at which time the product is ready for use or canning purposes.

Having thus described my invention, I claim as new and desire to secure by Letters Patent:

The herein described process for preparing wheat, consisting in soaking the wheat, then boiling it until a creamy starch forms on the surface, then repeatedly applying hot water for removing the starch and until the water is perfectly clear and transparent, then boiling the wheat and adding salt, and then replenishing the mass with boiling water under application of a slow heat until the water is absorbed and evaporated when the product is ready for canning.

In testimony whereof I have signed my name to this specification in the presence of two subscribing witnesses.

JABEZ BREWSTER.

Witnesses:
 HENRY FLYNN,
 EDGAR H. REEVES.